J. E. WALSH.

Improvement in Portable Machines for Loading and Unloading Vessels.

No. 131,982. Patented Oct. 8, 1872.

Witnesses:

Inventor:
John E. Walsh
By N. Crawford
atty.

UNITED STATES PATENT OFFICE.

JOHN E. WALSH, OF NEW YORK, N. Y.

IMPROVEMENT IN PORTABLE MACHINES FOR LOADING AND UNLOADING VESSELS.

Specification forming part of Letters Patent No. 131,982, dated October 8, 1872.

*To all whom it may concern:*

Be it known that I, JOHN E. WALSH, of the city, county, and State of New York, have invented certain Improvements in Portable Machines for Loading and Unloading Vessels or Transferring Goods, of which the following is a specification:

The object of this invention is to furnish a machine that will greatly facilitate the handling of packages or parcels in loading or unloading vessels, or for delivering goods to a storehouse from a stevedore's car, or for carrying goods or packages out of a storehouse to a like car to be transported to some other locality; and it consists in the construction and arrangement of the parts of the machine by which the result is attained, as will more fully hereinafter be described.

Figure 1:
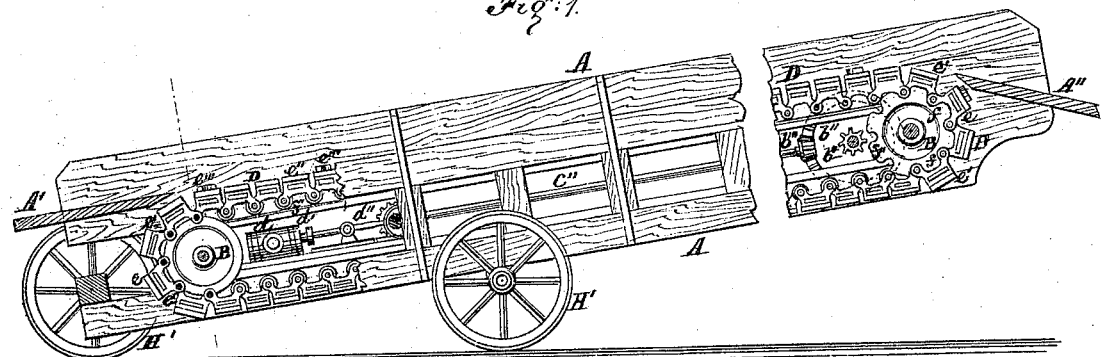
Figure 2:
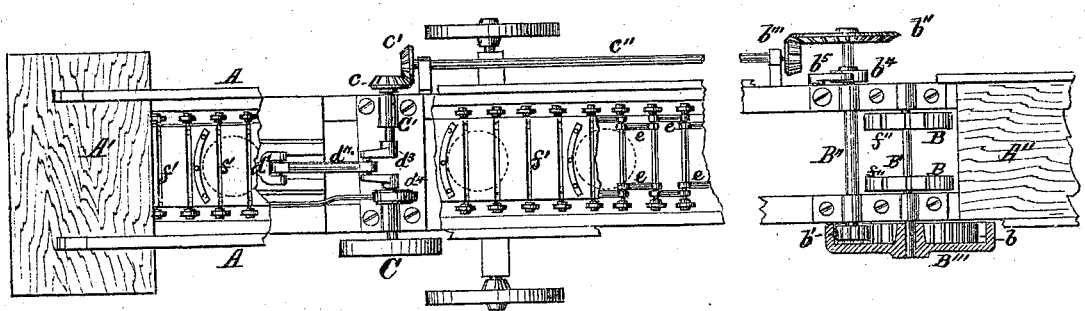
Figure 3:
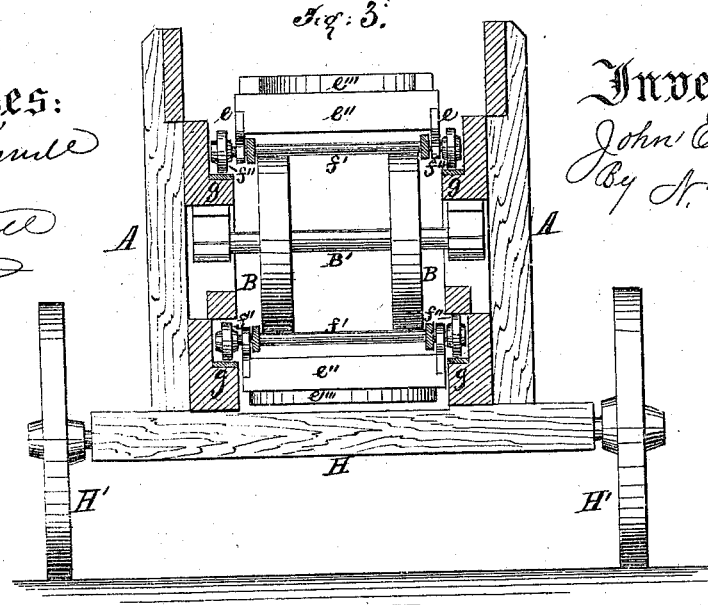

In the drawing, Figure 1 represents a side view of the machine with parts of the side broken away to show some of the actuating parts; Fig. 2, a longitudinal sectional view in detail of parts seen in Fig. 1; and Fig. 3 is a cross-sectional view.

A is the casing or framing that contains the actuating parts. A' is the receiving and A'' the delivering platform. B B are pulleys fast on shaft B' and revolve with it, and have notches in the peripheries to receive transverse rods that hold the links of an endless chain together. C is a driving-pulley on transverse shaft C', and when revolved by any proper power will revolve gear-wheel $c$, which, gearing into wheel $c'$ on shaft $c'''$ will revolve gear-wheel $b'''$, and that will revolve gear-wheel $b''$ on transverse shaft B'', upon which is pinion $b$ that gears into wheel $b$ inclosed in casing B''' and fast on shaft B', upon which are pulley-wheels B. D is an endless chain revolving around pulleys B, and is constructed of links $e$ having longitudinal slots $e'$ parallel with the plane top part and eyes $f$ at the bottom, as seen in Fig. 1. $f f$ are transverse rods that go through the eyes $f$ of link $e$ and connect the links together, as seen at the center of Fig. 2. $g\ g$ are tracks in the frame or casing A, upon which run wheels $f'''$ that revolve on transverse rods $f$. $e''\ e''$ are sections of the platform of endless chain D and are constructed at each end in such manner that a portion of the end of the platform will enter into the longitudinal slot $e'$ and a portion will be above and rest upon the top or plane part of link $e$ at each end, when the transverse rod $f'$ that passes through the eyes $f$ will hold the chain with the platforms in place. $e'''\ e'''$ are crescent-shaped cleats or stops fast on the top sides of a portion of the sectional platforms, to prevent barrels or other packages from being moved from their position while being transported the length of the endless chain, the curvature of these stops being of such form as to hold whatever package placed before it from being moved from its place, as seen in dotted lines in Fig. 2. H H are axles that support the machine. H' H' are wheels that receive the ends of the axles and by which the machine is carried from place to place, as circumstances require. $d$ represents a steam-cylinder placed within the endless chain D. $d'$ is a piston working in the steam-cylinder $d$ and connected to the pitman $d''$, which is attached to cranks $d^3$ on shaft C', and by which means the shaft C' can be revolved, which, through gear-wheels $c$ and $c'$, shaft $c''$, gear-wheels $b'''$ and $b''$, shaft B'', wheels $b'$ and $b$ will revolve pulleys B when the transverse rods $f'$ will come into notches $f'''$ on the rim of pulleys B and revolve the endless chain or apron D.

The machine thus constructed and arranged can be planted at the storehouse and receive boxes, bales, barrels, or packages of goods of any description upon the receiving-table or platform A', when such package is placed upon the endless chain before a cleat. The endless chain, being in motion, will carry such package to the opposite end of the machine, when such package will be forced off the apron D on to the inclined chute or delivering-table A'' to go onto the deck of a vessel or onto the car of a stevedore from the deck of a vessel, as the case may be. The delivery end of the machine can be elevated up to any angle less than that at which they would slide or fall off by their own gravity, and there will be no danger of the endless apron or chain running back, as ratchet-wheel $b^4$ on shaft B'', and revolving with it, has a spring-pawl, $b^5$, that catches into the notches and would prevent any backward motion of the apron by reason of its inclination or heavy load upon it. It is portable and can be taken to any position where a truck or car for carrying merchandise can be safely taken, and, having the means for furnishing its own power for operating, it becomes a desirable machine. The machine may be of any length to suit the surrounding conditions and of sufficient strength to insure safety in handling any kind of heavy goods or packages.

Having thus described my invention, what I claim, and desire to secure by Letters Patent, is—

1. The combination of the slotted links *e* having eyes *f*, sectional platforms *e''*, stops or cleats *e'''*, transverse rods *f'*, revolving wheels *f''*, and tracks *g*, with the revolving pulleys B, constructed and operating substantially in the manner and for the purpose described.

2. The combination of the endless apron or chain, constructed as above described and having the spring-pawl and ratchet-wheel attached thereto with the piston of a steam-engine, substantially as herein described.

3. The combination of a machine such as is above described and having the steam-engine therein with the transporting-wheels H' and axles H, substantially as and for the purposes described.

JOHN E. WALSH.

Witnesses:
JOHN R. O'HALLORAN,
JAMES COWAN.